(12) United States Patent
Todd

(10) Patent No.: US 11,657,854 B2
(45) Date of Patent: May 23, 2023

(54) SYSTEM AND METHOD FOR RAPID REPLACEMENT OF ROBOTIC MEDIA MOVER IN AUTOMATED MEDIA LIBRARY

(71) Applicant: QUANTUM CORPORATION, San Jose, CA (US)

(72) Inventor: Christian Allen Todd, Parker, CO (US)

(73) Assignee: QUANTUM CORPORATION, San Jose, CA (US)

( * ) Notice: Subject to any disclaimer, the term of this patent is extended or adjusted under 35 U.S.C. 154(b) by 0 days.

(21) Appl. No.: 17/570,003

(22) Filed: Jan. 6, 2022

(65) Prior Publication Data
US 2022/0130429 A1    Apr. 28, 2022

Related U.S. Application Data

(63) Continuation of application No. 16/677,529, filed on Nov. 7, 2019, now Pat. No. 11,342,004.

(51) Int. Cl.
*G11B 33/04* (2006.01)
*G11B 23/03* (2006.01)
*G11B 15/68* (2006.01)
*G11B 17/22* (2006.01)

(52) U.S. Cl.
CPC ........ *G11B 33/0461* (2013.01); *G11B 15/688* (2013.01); *G11B 15/6835* (2013.01); *G11B 17/225* (2013.01); *G11B 23/0306* (2013.01)

(58) Field of Classification Search
CPC ............ G11B 33/0461; G11B 15/6835; G11B 15/688; G11B 17/225; G11B 23/0306; G11B 15/675
See application file for complete search history.

(56) References Cited

U.S. PATENT DOCUMENTS

| | | | |
|---|---|---|---|
| 5,498,116 A | 3/1996 | Woodruff et al. | |
| 5,917,675 A | 6/1999 | Yang | |
| 6,385,145 B1 | 5/2002 | Ostwald | |
| 7,184,242 B1 | 2/2007 | Ostwald et al. | |
| 7,230,791 B1 * | 6/2007 | Ostwald | G11B 33/022 360/92.1 |
| 8,699,177 B2 * | 4/2014 | Nespeca | G11B 15/6835 360/92.1 |
| 9,183,875 B2 * | 11/2015 | Ries | G06F 3/0632 |
| 10,026,445 B1 * | 7/2018 | Gale | G11B 23/28 |

(Continued)

*Primary Examiner* — Brian E Miller
(74) *Attorney, Agent, or Firm* — Roeder & Broder LLP; James P. Broder

(57) ABSTRACT

A mover replacement system for removing a media mover, movable between an operating position and a removable position, from within a media library includes a service tray and a capture assembly. The service tray is removably positionable within the library housing. The service tray includes a tray body. The capture assembly is configured to enable the service tray to securely receive and releasably retain the media mover when the media mover is in the removable position. The capture assembly includes at least one locking mechanism that is movable relative to the tray body between a retracted position when the at least one locking mechanism is positioned not to engage the media mover, and a fully extended position when the at least one locking mechanism is positioned to retain the media mover relative to the tray body when the media mover is in the removable position.

20 Claims, 10 Drawing Sheets

(56) References Cited

U.S. PATENT DOCUMENTS

| | | | |
|---|---|---|---|
| 10,888,016 B2* | 1/2021 | Jensen | H04L 67/1008 |
| 2003/0113193 A1* | 6/2003 | Ostwald | G11B 15/6835 |
| | | | 360/92.1 |
| 2003/0123300 A1* | 7/2003 | Campbell | G11B 15/6835 |
| 2004/0254678 A1 | 12/2004 | Hellman et al. | |
| 2005/0036230 A1* | 2/2005 | Dickey | G11B 15/6835 |
| | | | 360/92.1 |
| 2005/0125816 A1* | 6/2005 | Ostwald | G11B 17/225 |
| 2005/0195520 A1 | 9/2005 | Starr et al. | |
| 2007/0008640 A1 | 1/2007 | Sasaki | |
| 2008/0186614 A1 | 8/2008 | Kotaki et al. | |
| 2011/0167589 A1* | 7/2011 | Hartl | G11B 17/22 |
| | | | 16/85 |
| 2013/0302116 A1* | 11/2013 | Hill | G11B 15/6835 |
| | | | 414/275 |
| 2013/0320827 A1 | 12/2013 | Manes et al. | |
| 2013/0322223 A1* | 12/2013 | Minemura | G11B 15/6835 |
| | | | 369/75.11 |
| 2014/0211602 A1 | 7/2014 | Hetzler et al. | |
| 2014/0271065 A1 | 9/2014 | Manes | |
| 2015/0086305 A1* | 3/2015 | Ostwald | G11B 15/6835 |
| | | | 414/281 |
| 2016/0176632 A1* | 6/2016 | Manes | G11B 15/6835 |
| | | | 414/277 |
| 2016/0180876 A1* | 6/2016 | Ostwald | G11B 17/225 |
| | | | 901/29 |
| 2016/0185578 A1* | 6/2016 | Manes | A47B 51/00 |
| | | | 74/530 |
| 2016/0299706 A1 | 10/2016 | Jesionowski et al. | |
| 2017/0084303 A1* | 3/2017 | Todd | G11B 17/225 |
| 2017/0084304 A1 | 3/2017 | Fiebrich-Kandler et al. | |
| 2019/0233228 A1 | 8/2019 | Gleichauf et al. | |
| 2020/0357440 A1* | 11/2020 | Takahashi | G11B 23/0313 |
| 2021/0142830 A1* | 5/2021 | Todd | G11B 15/6835 |
| 2022/0130429 A1* | 4/2022 | Todd | G11B 33/0461 |

* cited by examiner

SYSTEM AND METHOD FOR RAPID REPLACEMENT OF ROBOTIC MEDIA MOVER IN AUTOMATED MEDIA LIBRARY

RELATED APPLICATION

This application is a Continuation Application and claims the benefit under 35 U.S.C. 120 on co-pending U.S. patent application Ser. No. 16/677,529, filed on Nov. 7, 2019, and entitled "SYSTEM AND METHOD FOR RAPID REPLACEMENT OF ROBOTIC MEDIA MOVER IN AUTOMATED MEDIA LIBRARY". As far as permitted, the contents of U.S. patent application Ser. No. 16/677,529 are incorporated in their entirety herein by reference.

BACKGROUND

Automated media libraries are commonly utilized for purposes of writing data to and reading data from media cartridges. In particular, the automated media libraries typically include a robotic media mover that selectively retrieves and/or moves media cartridges as desired between storage slots and media drives within the media library. More specifically, upon receiving a signal to access a certain media cartridge, the media mover can be manipulated to physically retrieve the requested media cartridge from its associated storage slot in the media library. Subsequently, the media mover moves the media cartridge to an appropriate media drive, and inserts the media cartridge into a drive housing of the media drive so that requested read/write operations can be performed. Upon completion of the requested read/write operations, the media mover can then return the media cartridge to an appropriate storage slot.

Unfortunately, in current media libraries, most media movers can be very difficult to remove or replace from the media library when such removal or replacement is warranted. For example, removal or replacement of the media movers often requires partial disassembly of the media library or elaborate procedures to get them out. Some such procedures even require cutting electrical cables to accomplish removal. Accordingly, it is desired to develop a system and method for easily and rapidly removing and/or replacing media movers within an automated media library.

SUMMARY

The present invention is directed toward a mover replacement system for quickly and easily removing a media mover from within a media library. The media library includes a library housing. The media mover is movable between an operating position and a removable position. In various embodiments, the mover replacement system includes a service tray and a capture assembly. The service tray is removably positionable within the library housing. The service tray includes a tray body. The capture assembly is configured to enable the service tray to securely receive and releasably retain the media mover when the media mover is in the removable position. The capture assembly includes at least one locking mechanism that is movable relative to the tray body between a retracted position when the at least one locking mechanism is positioned not to engage the media mover, and a fully extended position when the at least one locking mechanism is positioned to retain the media mover relative to the tray body when the media mover is in the removable position so that the service tray and the media mover are movable as an integral unit out of and into the library housing.

In some embodiments, the capture assembly further includes a first sensor that is positioned adjacent to the at least one locking mechanism, the first sensor being configured to sense a position of the media mover relative to the at least one locking mechanism.

In certain embodiments, the capture assembly further includes a mover assembly that selectively moves the at least one locking mechanism between the retracted position and the fully extended position. The mover assembly includes a motor shaft, a motor that selectively rotates the motor shaft, and a mechanism engager that engages an engaged surface of the at least one locking mechanism. In such embodiments, rotation of the motor shaft rotates the mechanism engager to move the at least one locking mechanism between the retracted position and the fully extended position. In some such embodiments, the capture assembly can further include a sensor assembly including a first sensor that senses the rotation of the motor shaft as the at least one locking mechanism is being moved between the retracted position and the fully extended position.

In some embodiments, the tray body defines a tray opening, and the media mover is releasably retained within the tray opening.

In certain such embodiments, the at least one locking mechanism includes a first extension arm and a second extension arm; wherein when the at least one locking mechanism is in the retracted position, neither the first extension arm nor the second extension arm extend into the tray opening; and wherein when the at least one locking mechanism is in the fully extended position, both the first extension arm and the second extension arm extend into the tray opening.

In some such embodiments, the at least one locking mechanism is further movable relative to the tray body to a partially extended position wherein the first extension arm extends into the tray opening but the second extension arm does not extend into the tray opening.

In certain embodiments, the mover replacement system further includes a plurality of guide rails that are coupled to the library housing, the guide rails being configured to guide the movement of the service tray into and out of the library housing.

In some embodiments, the library housing includes an insert cavity that is configured to receive the service tray.

In certain embodiments, the mover replacement system further includes an alignment assembly that is configured to ensure that the service tray is properly aligned within the library housing, the alignment assembly including a plurality of first alignment members that are coupled to the library housing, and a plurality of second alignment members that are coupled to the service tray. In such embodiments, each of the plurality of second alignment members is configured to engage one of the plurality of first alignment members as the service tray is positioned within the library housing.

The present invention is also directed toward a media library including a media mover and the mover replacement system as described above.

Additionally, the present invention is further directed toward a mover replacement system for removing a media mover from a media library, the media library including a library housing, the media mover being movable between an operating position and a removable position, the mover replacement system including a service tray that is removably positionable within the library housing, the service tray being configured to releasably retain the media mover when the media mover is in the removable position so that the service tray and the media mover are movable as an integral unit out of and into the library housing; and an alignment assembly that is configured to ensure that the service tray is properly aligned within the library housing, the alignment assembly including a plurality of first alignment members that are coupled to the library housing, and a plurality of second alignment members that are coupled to the service tray; wherein each of the plurality of second alignment members is configured to engage one of the plurality of first alignment members as the service tray is positioned within the library housing; and wherein each of the plurality of second alignment members is configured not to engage one of the plurality of first alignment members when the service tray has been removed from within the library housing.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Embodiments of the present invention are described herein in the context of a mover replacement system (sometimes also referred to herein as a "replacement system") and method for removing and/or replacing a media storage mover assembly (or "media mover") from within an automated media library (sometimes also referred to herein as a "media library"). More specifically, as provided in detail herein, the replacement system of the present invention enables an operator to quickly and easily remove and/or replace the media mover from within the media library as necessary, without partial disassembly of the media library or elaborate procedures, and without the need to disconnect or cut any cables in order to effectuate the removal and/or replacement process.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
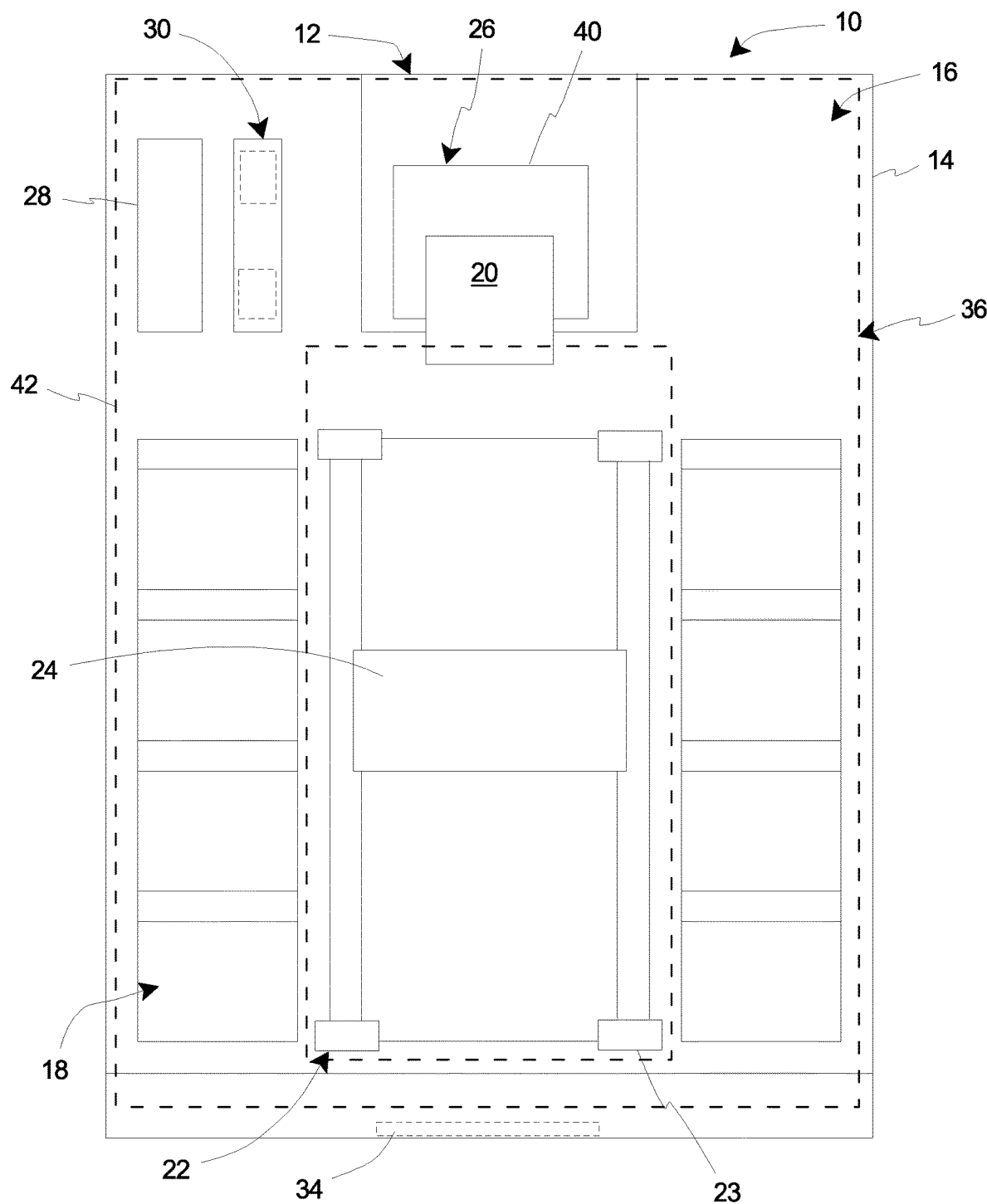
FIG. 1 is a simplified schematic top view illustration of an embodiment of an automated media library having features of the present invention, the automated media library including a media mover and a mover replacement system having a service tray.

FIG. 1 is a simplified schematic top view illustration of a media library 10, e.g., a tape library in certain embodiments, including a media drive system 12, e.g., a tape drive system in certain embodiments, having features of the present invention. In FIG. 1, a top cover (not shown) has been omitted for clarity so that the interior of the media library 10 is visible. The design of the media library 10 can be varied as desired. In particular, the media library 10 can have any suitable design that is capable of storing a plurality of media cartridges. More specifically, it is noted that the media library 10 illustrated in FIG. 1 is just one non-exclusive example of a media library 10 usable with the present invention, and no limitations are intended based on the specific type and/or size of the media library 10 shown in FIG. 1. Additionally, although the media library 10 shown and described relative to FIG. 1 is specifically shown and/or described at times as a tape cartridge library or tape library, it is understood that the present invention is equally applicable for use with any other suitable types of libraries using other types of media cartridges, such as optical disks, magnetic disk drives, emulated or virtual media drives, etc., as non-exclusive examples. However, for ease of discussion, FIG. 1 and certain other Figures herein are sometimes described using tape cartridges as the applicable media cartridges, although this is not intended to restrict or limit the present invention in this manner.

In various embodiments, as illustrated in FIG. 1, the media library 10 can include one or more of: (i) a library housing 14 that defines a library interior 16, (ii) a plurality of storage slots 18 that are each configured to receive and selectively retain (and store) a media cartridge 20, e.g., a tape cartridge in certain embodiments, (iii) a rack assembly 22 including one or more racks 23, (iv) a media cartridge mover assembly 24 (also sometimes referred to herein as a "media mover"), (v) the media drive system 12 including one or more media drives 26, e.g., tape drives in certain embodiments, (vi) a power supply 28, (vii) a control system 30, (viii) a graphical user interface 34 (illustrated in phantom, and also sometimes referred to herein as a "GUI"), and (ix) a mover replacement system 36 (illustrated in phantom, and sometimes also referred to herein simply as a "replacement system"). It is appreciated that in different embodiments, the media library 10 can include more components or fewer components than what is illustrated and described in relation to FIG. 1. For example, as provided herein, in certain embodiments, the media library 10 can further include a service module 238 (illustrated in FIG. 2A) into which the mover replacement system 36 can be integrated. Additionally, or in the alternative, in some embodiments, the media library 10 can include more than one service module 238, and a mover replacement system 36 can be integrated into each of the service modules 238.

As an overview, the mover replacement system 36 enables a user or operator to quickly and easily remove and/or replace the media mover 24 from within the media library 24 when necessary or desired. More particularly, in various embodiments, the media mover 24 can be quickly and easily moved from an operating position into a removable position where the media mover 24 can be releasably retained within a service tray 42 (illustrated in phantom) of the mover replacement system 36; and the service tray 42, with media mover 24 securely retained therein, can then be quickly and easily removed as an integral unit from within the library housing 14, e.g., from within a service module housing 248 (illustrated in FIG. 2A, and also sometimes referred to simply as a "module housing") that can be included as part of the service module 238 and/or the mover replacement system 236. The media mover 24 can then be removed from the service tray 42 for purposes of maintenance, repair and/or replacement. A properly maintained, repaired and/or replaced media mover 24 can then be positioned and retained again in the service tray 42 (the same service tray 42 or another service tray 42) before the service tray 42 is inserted back into the module housing 248 of the service module 238. The media mover 24 can then be released from the service tray 42 and moved back into the operating position to provide any necessary and desired functions of the media mover 24 within the media library 10. Various features and components of the service module 238, the replacement system 36, and the service tray 42 will be described in greater detail herein below.

It is appreciated that the need or desire to remove and/or replace the media mover 24 from within the media library 10 can be identified in many different ways. For example, the need to remove and/or replace the media mover 24 can be identified simply from failure of the media mover 24 to operate as required. Additionally, the media mover 24 can be removed and/or replaced based on a scheduled maintenance or replacement of the media mover 24. Further, removal and/or replacement of the media mover 24 can be recommended via cloud analytics, i.e. remote monitoring of the usage, condition and error trends of the media library 10 and/or the media mover 24 by a suitable system operator/administrator. Still further, the need or desire to remove and/or replace the media mover 24 from within the media library 10 can be identified in another suitable manner.

The library housing 14 is configured to retain various components of the media library 10. For example, as shown in FIG. 1, the plurality of storage slots 18, the rack(s) 23 of the rack assembly 22, the media mover 24, the one or more media drives 26 of the media drive system 12, the power supply 28, and the control system 30 can all be received and retained at least substantially, if not entirely, within the library interior 16 that is defined by the library housing 14. Additionally, in various embodiments, the mover replacement system 36, e.g., the service tray 42, can be selectively and/or removably positioned within the library interior 16 that is defined by the library housing 14. In some such embodiments, the mover replacement system 36, e.g., the service tray 42, can be selectively and/or removably positioned within the module housing 248 of the service module 238.

Additionally, in certain embodiments, as illustrated in FIG. 1, the library housing 14 can be rigid and have a substantially rectangular-shaped cross-section. Alternatively, the library housing 14 can have another suitable shape or configuration. For example, the library housing 14 can have a substantially square-shaped or any other suitable shaped cross-section. Further, the library housing 14 may be constructed of any number of conventional materials such as, for example, those utilized in industry standard rack mount cabinets.

In the embodiment shown in FIG. 1, the plurality of storage slots 18 can be positioned within the library housing 14, with the storage slots 18 being configured to receive and retain (and store) the media cartridge(s) 20. More particularly, in various embodiments, each of the storage slots 18 is configured to receive and retain a single media cartridge 20. It is noted that no media cartridges 20 are shown as being retained within the storage slots 18 in FIG. 1 for clarity. In various embodiments, the media library 10 can include any suitable number of storage slots 18 that are aligned in any suitable manner, and/or the media library 10 can be designed to retain any suitable number of media cartridges 20. Alternatively, the storage slots 18 can be arranged in a different manner than is illustrated and described relative to FIG. 1.

The rack assembly 22 and/or the one or more racks 23 are configured to support the media mover 24 during use of the media mover 24 within the media library 10. The design and configuration of the rack assembly 22 can be varied to suit the specific requirements of the media library 10. For example, in one non-exclusive embodiment, the rack assembly 22 can include four individual racks 23 that are spaced apart from one another. Additionally, in some embodiments, each rack 23 can be oriented in a generally vertical direction and can extend a height that is sufficient to enable the media mover 24 to effectively retrieve a media cartridge 20 from any of the plurality of storage slots 18. Alternatively, the rack assembly 22 can include a different number of racks 23. For example, in some non-exclusive alternative embodiments, the rack assembly 22 can include two racks 23, three racks 23 or more than four racks 23 that can be spaced apart from one another.

The media mover 24, when in the operating position, selectively, e.g., upon request of a user, retrieves and moves the media cartridge 20 as desired between the storage slots 18 and the media drives 26. In particular, during use, upon receiving a signal from the control system 30 to access a certain media cartridge 20, the media mover 24 can be manipulated to physically retrieve the requested media cartridge 20 from its associated storage slot 18 in the media library 10. Subsequently, the media mover 24 moves the media cartridge 20 to an appropriate media drive 26, and inserts the media cartridge 20 into a drive housing 40 of the media drive 26 so that the requested read/write operations can be performed. Upon completion of the requested read/write operations, the media mover 24 can then return the media cartridge 20 to an appropriate storage slot 18.

Additionally, it is appreciated that although a single media mover 24 is illustrated in FIG. 1, the media library 10 can be designed to include more than one media mover 24. For example, in one non-exclusive alternative embodiment, the media library 10 can include two media movers 24 to function in different portions of the media library 10 and/or to provide redundancy in the event that one of the media movers 24 fails.

The one or more media drives 26 are configured for reading and/or writing data with respect to the media cartridge 20. The number of media drives 26 provided within the media library 10 can be varied to suit the specific requirements of the media library 10. For example, in certain embodiments, the media library 10 can include three media drives 26 that are stacked substantially one on top of another (with limited spacing therebetween). Alternatively, the media library 10 can include greater than three or fewer than three media drives 26 and/or the media drives 26 can be positioned in a different manner relative to one another. Further, depending on the specific design of the media library 10, the media drives 26 can be adapted for use with different types of media, such as tape cartridges, optical drives, hard disk drives, etc.

Further, in certain embodiments, the media library 10 can include more than a single media drive system 12 for purposes of providing the one or more media drives 26. For example, in some embodiments, the media library 10 can include a plurality of media drive systems 12, with each media drive system 12 including one or more individual media drives 26. In one such embodiment, the media library 10 can include three individual media drive systems 12, with each media drive system 12 including a single media drive 26, to provide a total of three media drives 26 for the media library 10. Alternatively, the media library 10 can include any desired number of media drive systems 12 and/or media drives 26.

The power supply 28 provides electrical power in a well-known manner to the one or more media drives 26, the media mover 24, the control system 30, the mover replacement system 36 and/or additional media libraries 10. The power supply 28 can be interfaced with these components as well as with an external power source in a well-known manner using industry standard cabling and connections. Alternatively, the power supply 28 can be interfaced with these components in another manner.

The control system 30 provides the desired and necessary control for general functionality of the media library 10. The control system 30 can have any suitable design, many of which are well-known in the industry. For example, in one embodiment, the control system 30 can include a standard driver interface unit for receiving digital commands and translating the commands into driving currents, such as step pulses for controlling stepper motors, and/or for controlling the mover replacement system 36. Further, the control system 30 can include a standard programmable general purpose computer formed on a single plug-in card unit and can include a programmed microprocessor or microcontroller, memory, communication interface, control interface, connectors, etc. Alternatively, the control system 30 can have a different design and/or the control system 30 can be positioned within the media library 10 in a different position or manner than that illustrated in FIG. 1.

Further, as shown, the media library 10 can also include the GUI 34, e.g., an interactive touchscreen display or another suitable graphical user interface, which allows the user to interact with and/or transmit requests or commands to the media library 10. For example, the GUI 34 can allow the user to transmit requests for moving certain media cartridges 20, i.e. with the media mover 24, between the storage slots 18 and the media drives 26. Additionally, the GUI 34 can further allow the user to transmit requests for removing and/or replacing the media mover 24, i.e. through operation of the mover replacement system 36.

The mover replacement system 36 is configured to enable the user to quickly and easily remove and replace the media mover 24 from within the library interior 16 of the library housing 14, as desired. More specifically, as described in greater detail herein below, the mover replacement system 36 includes the service tray 42, which is configured to selectively receive and releasably retain the media mover 24 when it is desired to move the media mover 24 out of or back into the library interior 16. With such design, the service tray 42, with the media mover 24 effectively retained thereon and/or secured thereto, can be quickly and easily removed from the library interior 16, and/or inserted back into the library interior 16. As such, the service tray 42 can be said to be selectively and/or removably positionable within the library housing 14, e.g., within the module housing 248.

Figure 2A:
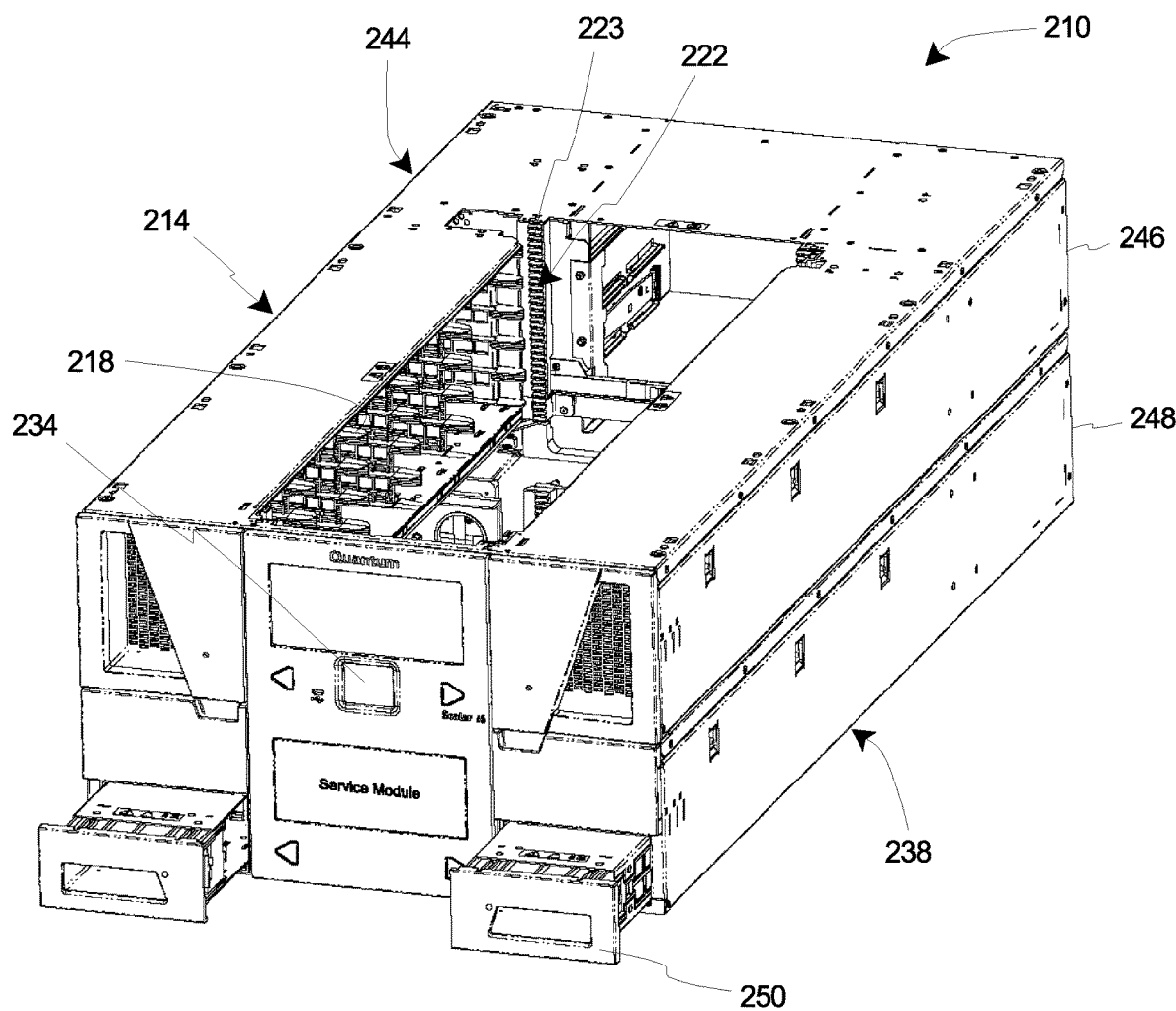
FIG. 2A is a front perspective view illustration of another embodiment of the automated media library, the automated media library including a service module.

FIG. 2A is a front perspective view illustration of another embodiment of the automated media library 210. As illustrated, the media library 210 includes a standard library module 244 (also referred to herein simply as a "library module"), and a service module 238 that is operably and/or mechanically coupled to the library module 244. Additionally, as shown, the media library 210 includes a library housing 214 that includes both a standard library housing 246 that is configured to retain various components included as part of the library module 244 of the media library 210, and the module housing 248 that is configured to retain various components included as part of the service module 238 of the media library 210.

In various embodiments, the library module 244 is configured to incorporate and/or include many of the components of the media library 210, such as those that have been illustrated and described above in relation to the media library 10 illustrated in FIG. 1. For example, in certain embodiments, the plurality of storage slots 218, the rack(s) 223 of the rack assembly 222, the one or more media drives of the media drive system, the power supply, and the control system can all be received and retained at least substantially, if not entirely, within the standard library housing 246 of the library module 244. Additionally, FIG. 2A also illustrates the GUI 234 that can be accessible to the user from an outer surface of the standard library housing 246. Further, the media mover 224 (illustrated in FIG. 2B) can also often be received and retained within the standard library housing 246 during use of the media library 210. However, as described in detail herein below, the media mover 224 is configured to move between the library module 244 and the service module 238 depending upon the intended use of the media library 210 at any given time. Stated in another manner, during use of the media library 210, the media mover 224 can be received and retained either within the standard library housing 246 or within the module housing 248 depending upon the intended use of the media library 210 at any given time. Still further, as provided herein, the media mover 224 will at least be moved so that it is received and retained within the module housing 248 of the service module 238 when it is desired to remove and/or replace the media mover 224 from within the library housing 214, i.e. with the mover replacement system 236 (illustrated more clearly in FIG. 2B).

As noted above, the service module 238 is operably and/or mechanically coupled to the library module 244.

More specifically, as shown in FIG. 2A, the service module 238 can be positioned substantially directly beneath and can be operably and/or mechanically coupled to the library module 244. Alternatively, the service module 238 can be positioned in a different manner relative to the library module 244, e.g., the service module 238 can be positioned substantially directly above the library module 244.

As illustrated, the mechanical coupling between the service module 238 and the library module 244 can be accomplished through a mechanical coupling between the module housing 248 of the service module 238 and the standard library housing 246 of the library module 244. It is appreciated that the mechanical coupling between the module housing 248 and the standard library housing 246 can be accomplished in any suitable manner.

Additionally, FIG. 2A illustrates a pair of service module magazines 250 (also referred to herein simply as "module magazines") that have been partially removed from the module housing 248 of the service module 238. As provided herein, in some embodiments, the service module 238 can include a plurality of service module storage slots 352 (illustrated in FIG. 3, and also referred to herein as "module storage slots") to provide additional storage opportunities for storing additional media cartridges 20 (illustrated in FIG. 1) within the media library 210. The module storage slots 352 can be incorporated within the module magazines 250.

Figure 2B:
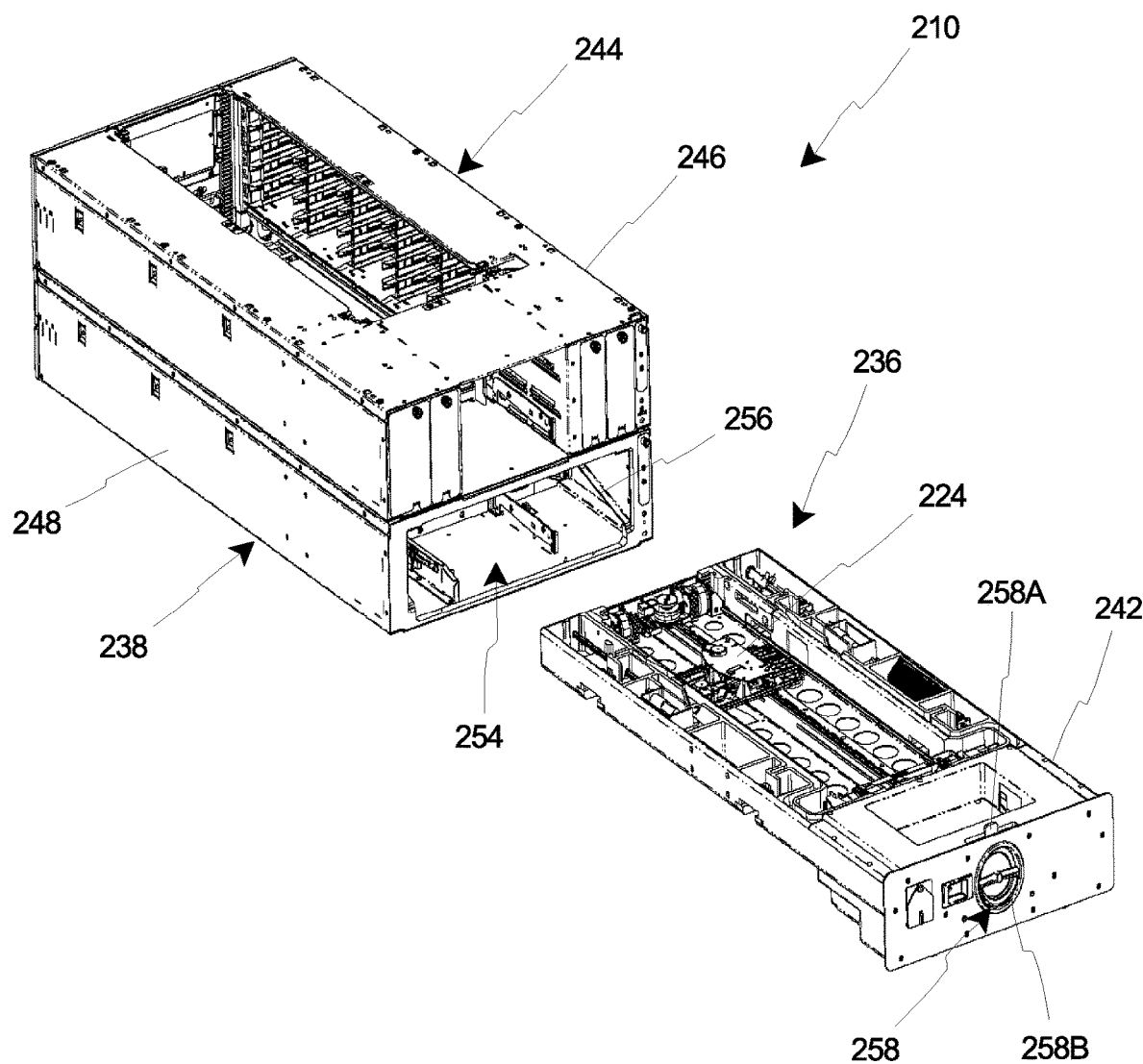
FIG. 2B is a partially exploded, rear perspective view illustration of the automated media library illustrated in FIG. 2A.

FIG. 2B is a partially exploded, rear perspective view illustration of the automated media library 210 illustrated in FIG. 2A. FIG. 2B again illustrates that the media library 210 includes the library module 244 and the service module 238, with the standard library housing 246 of the library module 244 mechanically coupled to the module housing 248 of the service module 238. Additionally, FIG. 2B also illustrates the service tray 242, with the media mover 224 securely and releasably retained thereon, having been removed as an integral unit from an insert cavity 254 as defined by the module housing 248.

Also shown in FIG. 2B, the replacement system 236 can include a pair of guide rails 256 (or "guides", only one is clearly visible in FIG. 2B) that are coupled to the module housing 248 and that are configured to guide the movement of the service tray 242 into and out of the insert cavity 254 of the module housing 248. In some embodiments, the guides 256 are oversized guides that enable easier insertion and/or removal of the service tray 242 from the module housing 248. Additionally, the oversized guides 256 can also be provided with a large lead-in ramp which can effectively minimize the amount of space required behind the media library 210 for removal and/or replacement of the media mover 224.

It is appreciated that initiating removal and/or replacement of the media mover 224 can be accomplished in several ways. For example, removal and/or replacement of the media mover 224 can be initiated by requesting it over the network or via the GUI 234 (illustrated in FIG. 2A). Additionally, or in the alternative, removal and/or replacement of the media mover 224 can be initiated by pressing and holding buttons on the front of the media library 210 or pressing a button at the rear of the media library 210. Still alternatively, removal and/or replacement of the media mover 224 can be initiated in another suitable manner.

As described in detail herein, once any of these methods have been implemented to initiate removal and/or replacement of the media mover 224, the media mover 224 will move to the service tray 242, i.e. into the removable position. The service tray 242 will then capture and lock in place the media mover 224 and indicate its readiness to be removed via the network, local GUI 234 and/or illuminated features. Additionally, in the event of a power failure or if the media mover 224 cannot otherwise move itself into the service tray 242 in the desired automated manner, the media mover 224 can alternatively be manually moved into the removable position in the service tray 242 from the front of the media library 210. In some embodiments, access to the media mover 224 and/or the replacement system 236 can be gained by an operator via removal or partial removal of the module magazines 250 (illustrated in FIG. 2A) and/or removal or partial removal of magazines that include the storage slots 18 (illustrated in FIG. 1) positioned within the standard library housing 246.

Further, as illustrated in FIG. 2B, the replacement system 236 can further include a latch assembly 258 that can be positioned at the rear of the media library 210. For example, when the service tray 242 and media mover 224 are ready for removal, the person servicing the media mover 224 simply needs to activate the latch assembly 258. More particularly, as shown in FIG. 2B, the latch assembly 258 can include a retaining latch 258A that is configured to selectively engage the module housing 248 so that the service tray 242 can be effectively retained within the module housing 248, and a latch activator 258B (or "latch rotator") that is configured to selectively move the retaining latch 258A between and engaged position (i.e. where the retaining latch 258A engages the module housing 248) and a disengaged position (i.e. where the retaining latch 258A no longer engages the module housing 248). For example, in one non-exclusive embodiment, the latch activator 258B can be selectively rotated so that the retaining latch 258A is moved between the engaged position and the disengaged position. Alternatively, the latch assembly 258 can have another suitable design.

Once the latch assembly 258, i.e. the retaining latch 258A, has been moved to the disengaged position, the operator can simply slide the service tray 242, with the media mover 224 securely and releasably retained therein, out of the back of the service module 238, i.e. out of the back of the module housing 248. A new and/or maintained and repaired service tray 242 and media mover 224 can then be inserted back into the module housing 248 of the service module 238, i.e. into the insert cavity 254 as defined by the module housing 248. Once positioned back inside the module housing 248, the latch activator 258B can be used to move the retaining latch 258A back to the engaged position, and the service tray 242 will again be securely retained in position within the module housing 248. Generally speaking, the entire procedure can be accomplished in less than two minutes and does not require any elaborate steps or any cutting or disconnecting of any cables.

Figure 3:
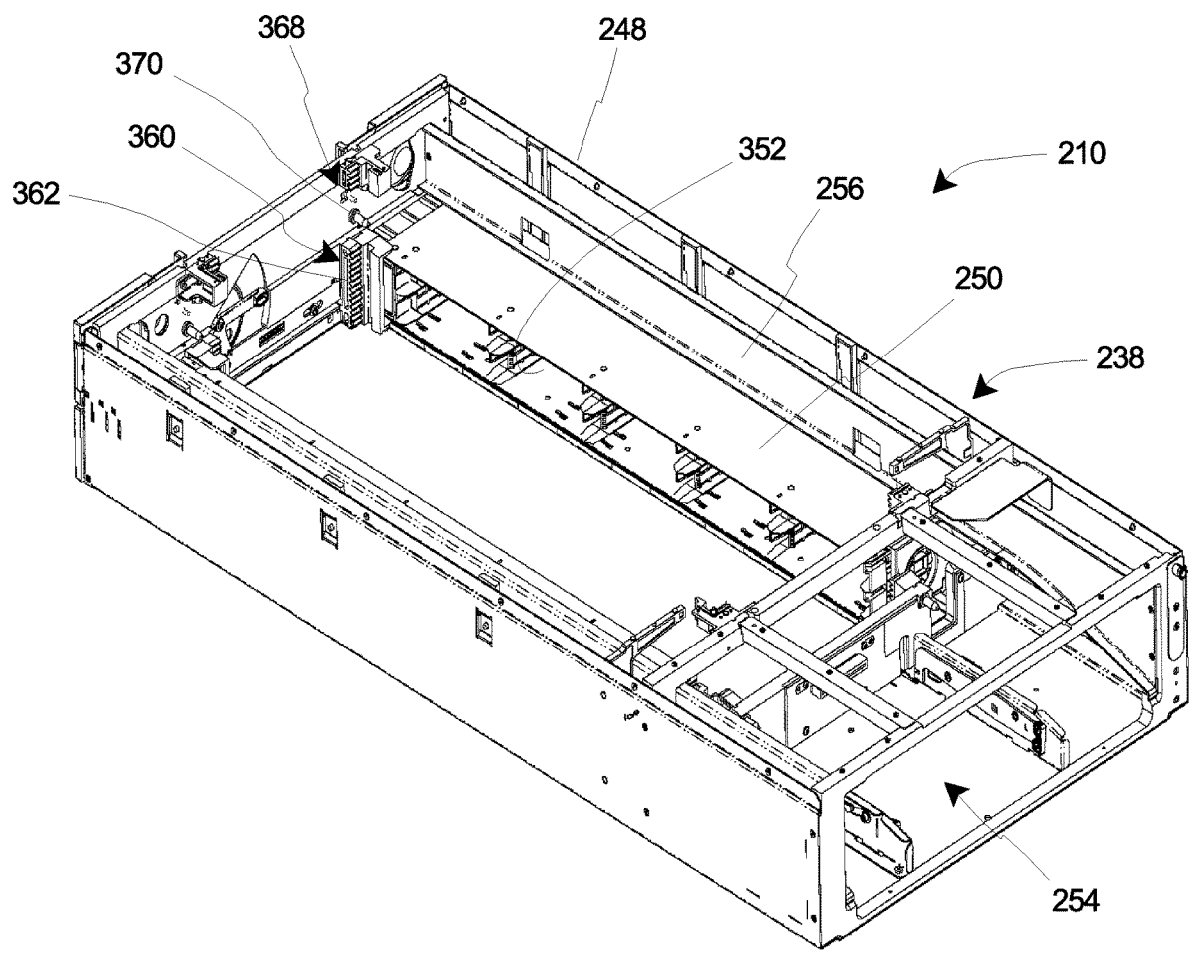
FIG. 3 is a perspective view illustration of a portion of the service module illustrated in FIG. 2A.

FIG. 3 is a perspective view illustration of a portion of the service module 238 illustrated in FIG. 2A. In particular, FIG. 3 is a perspective view illustration of the module housing 248, and various features and components that are included within the module housing 248, with the service tray 242 (illustrated in FIG. 2B) having been removed from within the insert cavity 254 as defined by the module housing 248. For example, it is appreciated that FIG. 3 again illustrates the guides 256 that are positioned within the module housing 248 for purposes of guiding the movement of the service tray 242 into and out of the module housing 248.

Additionally, also shown in FIG. 3 are the module storage slots 352 that can be included within the module magazines 250. As noted above, the module storage slots 352 are utilized to provide additional storage opportunities for storing additional media cartridges 20 (illustrated in FIG. 1)

within the media library 210. In particular, as with the storage slots 18 (illustrated in FIG. 1) positioned within the standard library housing 246 (illustrated in FIG. 2A), the module storage slots 352 positioned within the module housing 248 are configured to receive and retain (and store) the media cartridge(s) 20. In various embodiments, each of the module storage slots 352 is configured to receive and retain a single media cartridge 20. Additionally, the module housing 248 and the service module 238 can include any suitable number of module storage slots 352 that are aligned in any suitable manner, and/or the service module 238 can be designed to retain any suitable number of media cartridges 20. Alternatively, the module storage slots 352 can be arranged in a different manner than is illustrated and described relative to FIG. 3.

Further, as illustrated in FIG. 3, the service module 238 can also include a module rack assembly 360 including one or more module racks 362 that are configured to support the media mover 224 (illustrated in FIG. 2B) during use of the media mover 224 within the media library 210. The design and configuration of the module rack assembly 360 can be varied to suit the specific requirements of the media library 210. For example, in one non-exclusive embodiment, the module rack assembly 360 can include four individual module racks 362 that are spaced apart from one another. Additionally, in some embodiments, each module rack 362 can be oriented in a generally vertical direction and can extend a height that is sufficient to enable the media mover 224 to effectively retrieve a media cartridge 20 from any of the plurality of module storage slots 352. Alternatively, the module rack assembly 360 can include a different number of module racks 362. For example, in some non-exclusive alternative embodiments, the module rack assembly 360 can include two module racks 362, three module racks 362 or more than four module racks 362 that can be spaced apart from one another.

It is appreciated that the module racks 362 of the module rack assembly 360 will be substantially aligned with the racks 23 (illustrated in FIG. 1) of the rack assembly 22 (illustrated in FIG. 1) so that the media mover 224 can smoothly move between the racks 23 and the module racks 362. Additionally, it is further appreciated that in certain embodiments, the module racks 362 are spaced apart vertically from the racks 23 to allow for positioning of the service tray 242 (illustrated in FIG. 2B) within the module housing 248 (illustrated in FIG. 2A). As described in detail herein below, it is appreciated that in such embodiments the service tray 242 can include a tray rack assembly 464 (illustrated in FIG. 4), i.e. including tray racks 466 (illustrated in FIG. 4), that is positioned to be aligned vertically between the rack assembly 22 and the module rack assembly 360. With such design, the media mover 224 will be able to move smoothly between the racks 23, the tray racks 466 and the module racks 362. Additionally, such design further enables the media mover 224 to effectively access any desired media cartridges 20 that are positioned within the storage slots 18 in the standard library housing 246 and/or within the module storage slots 352 positioned within the module housing 248. Further, as described herein, the positioning of the media mover 224 along the tray racks 466 is desired when the media mover 224 is being captured by the service tray 242 for purposes of removal and/or replacement of the media mover 224 from within the media library 210.

Also illustrated in FIG. 3, and included as part of the module housing 248, is a portion of an alignment assembly 368 that is configured to ensure proper alignment of the service tray 242 within the module housing 248. In some embodiments, as shown in FIG. 3, the alignment assembly 368 can include a plurality of first alignment members 370, e.g., alignment pins, that are configured to engage a plurality of second alignment members 472 (illustrated in FIG. 4), e.g., alignment apertures, as the service tray 242 is being positioned within the module housing 248. More particularly, in such embodiments, during insertion of the service tray 242 into the module housing 248, each of the alignment pins 370 is positioned to engage one of the alignment apertures 472 so that the service tray 242 has the proper vertical and lateral positioning within the module housing 248.

In one embodiment, the alignment pins 370 can be secured to and/or included as part of the module housing 248, and the alignment apertures 472 can be included as part of the service tray 242. Alternatively, in another embodiment, the alignment pins 370 can be secured to and/or included as part of the service tray 242, and the alignment apertures 472 can be included as part of the module housing 248. Still alternatively, the alignment assembly 368 can have another suitable design for purposes of ensuring proper alignment of the service tray 242 within the module housing 248.

The alignment assembly 368 can include any suitable number of alignment pins 370 and alignment apertures 472. For example, in one non-exclusive alternative embodiment, the alignment assembly 368 can include four alignment pins 370, and four alignment apertures 472. Alternatively, the alignment assembly 368 can include greater than four or less than four alignment pins 370, and greater than four or less than four alignment apertures 472.

Figure 4:
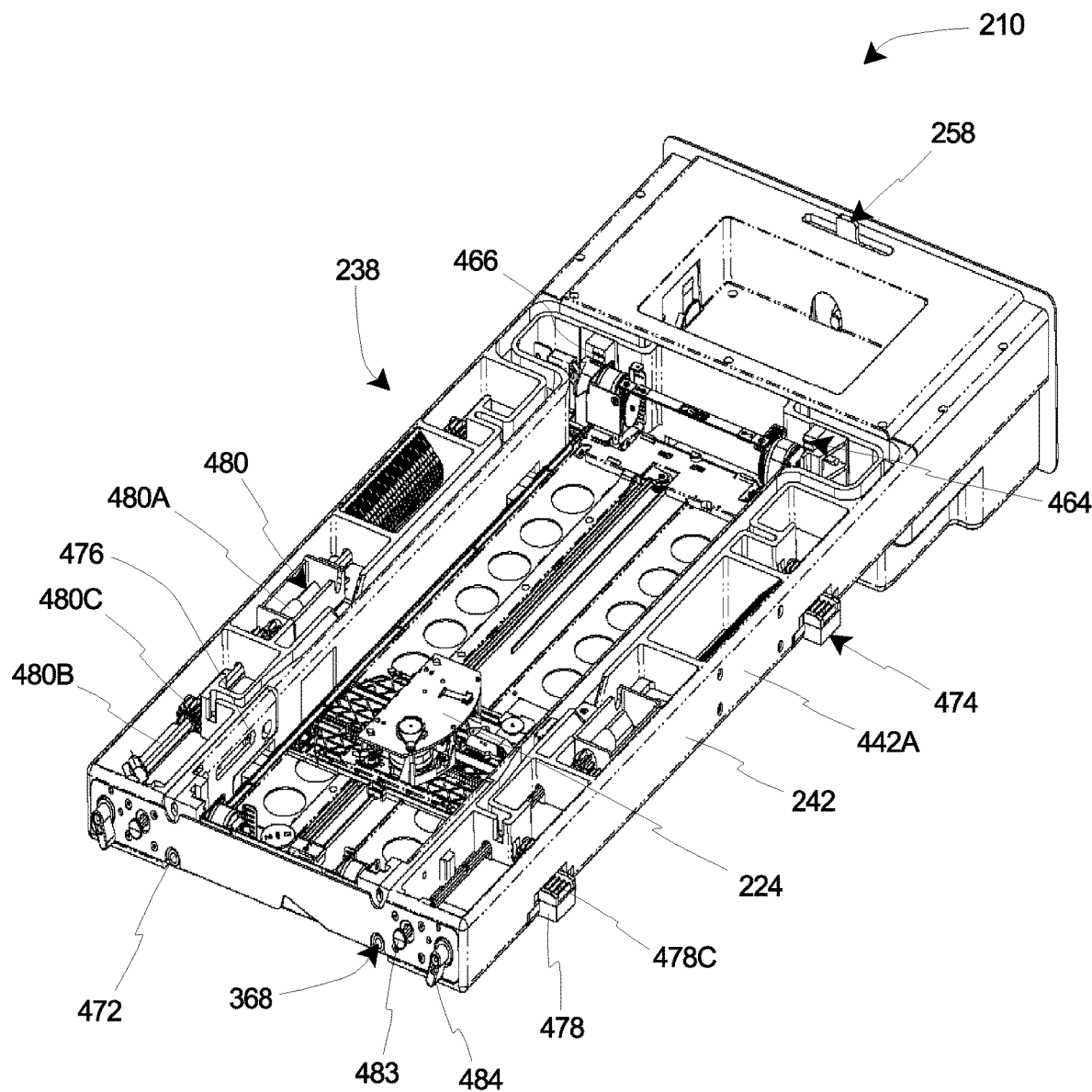
FIG. 4 is a perspective view illustration of an embodiment of the service tray that can be included within the service module illustrated in FIG. 2A, and an embodiment of the media mover that is retained within the service tray.

FIG. 4 is a perspective view illustration of the service tray 242 that can be included as part of the replacement system 236, and the media mover 224 that is selectively and releasably retained within the service tray 242. In particular, FIG. 4 illustrates various features and components of the replacement system 236 that can be incorporated into the service tray 242 for purposes of quickly and easily capturing and securing the media mover 224, and for purposes of quickly and easily moving the service tray 242 and media mover 224 as an integral unit into and out of the module housing 248 (illustrated in FIG. 2A).

The design of the replacement system 236 can be varied. As illustrated in FIG. 4, in various embodiments, the replacement system 236 can include one or more of the service tray 242, the alignment assembly 368, the tray rack assembly 464, the latch assembly 258, and a capture assembly 474. Additionally, or in the alternative, the replacement system 236 can include more components or fewer components than what are specifically illustrated in FIG. 4. Further, as described herein, it is appreciated that certain components of the replacement system 236 are incorporated into the module housing 248, e.g., the guides 356 and portions of the alignment assembly 368, and thus are not illustrated in FIG. 4.

As provided herein, the service tray 242 is configured to selectively receive and securely retain the media mover 224 when it is desired to remove and/or replace the media mover 224 from within the media library 210. As shown in FIG. 4, the service tray 242 includes a tray body 442A, and when the media mover 224 is securely retained by the service tray 242, the media mover 224 is configured to remain substantially stationary relative to the tray body 442A. More particularly, the tray body 442A defines a tray opening 542B (illustrated in FIG. 5A), and the media mover 224 is configured to selectively fit and be securely retained within the tray opening 542B as defined by the tray body 442A.

With regard to the alignment assembly 368, FIG. 4 illustrates the alignment apertures 472, which help to ensure the proper alignment of the service tray 242 within the module housing 248 (illustrated in FIG. 2A). More specifically, FIG. 4 illustrates that the alignment assembly 368 can include four alignment apertures 472 that are configured to engage the alignment pins 370 that are secured to and/or included as part of the module housing 248. As noted above, during insertion of the service tray 242 into the module housing 248, each of the alignment pins 370 is positioned to engage one of the alignment apertures 472 so that the service tray 242 has the proper vertical and lateral positioning within the module housing 248. The alignment pins 370 can have any suitable length and the alignment apertures 472 can have any suitable depth. For example, in one embodiment, the alignment pins 370 have a length of at least approximately one inch, and the alignment apertures 472 have a depth of at least approximately one inch. With such design, the alignment apertures 472 will engage the alignment pins 370 during the last approximately one inch of the seating process for positioning the service tray 242 within the module housing 248. Alternatively, the length of the alignment pins 370 and the depth of the alignment apertures 472 can be greater than or less than the values specifically set forth herein above.

Additionally, as noted above, when the service tray 242 is accurately positioned within the module housing 248, the tray rack assembly 464 is positioned to be aligned vertically between the rack assembly 22 (illustrated in FIG. 1) and the module rack assembly 360 (illustrated in FIG. 3). As further noted above, proper alignment is necessary so that the media mover 224 will be able to move smoothly between the racks 23 (illustrated in FIG. 1), the tray racks 466 and the module racks 362 (illustrated in FIG. 3).

It is appreciated that proper positioning of the racks 23, the tray racks 466 and the module racks 362 relative to one another can be very critical to the design of the replacement system 236. Thus, in some embodiments, the tray rack assembly 464 can further include a resilient member 476, e.g., a spring, which is configured to effectively spring-load the tray rack assembly 464 to ensure such proper alignment as the service tray 242 is positioned within the module housing 248. More particularly, the resilient member 476 enables reference surfaces to be spring-loaded against each other on the racks and in the chassis to make sure that the racks 23, the tray racks 466 and the module racks 362 properly aligned relative to one another. In some embodiments, the resilient member 476 is configured and/or biased to position the service tray 242 a small distance, e.g., one to two inches, away from a fully seated position within the module housing 248. As such, when the service tray 242 is being positioned within the module housing 248, the service tray 242 must be forced against the bias of the resilient member 476 in the last one to two inches of the seating process. With such design, positional variation between the tray racks 466 and the module racks 362, e.g., due to temperature variations, part tolerances, contamination, etc., can be effectively accommodated so that the desired alignment between the racks 23, the tray racks 466 and the module racks 362 can be achieved.

The capture assembly 474 is configured to enable the service tray 242 to securely receive and releasably retain the media mover 224 when the media mover 224 has been moved to the removable position and it is desired to remove and/or replace the media mover 224 from within the media library 210. The design of the capture assembly 474 can be varied to suit the requirements of the media library 210 and/or the replacement system 236 within which the capture assembly 474 is used. In various embodiments, the capture assembly 474 can include one or more of at least one locking mechanism 478, a mover assembly 480 and a sensor assembly 582 (illustrated, for example, in FIG. 5B). Additionally, or in the alternative, the capture assembly 474 can include more components or fewer components that what is illustrated and described herein. Further, in some embodiments, as shown in FIG. 4, the capture assembly 474 can also include a manual activator 483 and a manual mover 484 to enable manual capture of the media mover 224 by the service tray 242 in the event of power failure or if the capture system 474 otherwise fails to automatically secure the media mover 224 within the service tray 242.

The at least one locking mechanism 478 is configured to move relative to the tray body 442A so that the media mover 224 can be effectively secured and releasably retained within the service tray 242. It is appreciated that the capture assembly 474 can include any suitable number of locking mechanisms 478. For example, in one non- exclusive embodiment, the capture assembly 474 can include four locking mechanisms 478 that are spaced apart from one another, with two locking mechanisms 478 positioned along either side of the tray opening 542B. Alternatively, the capture assembly 474 can include greater than four or fewer than four locking mechanisms 478.

Figure 6A:
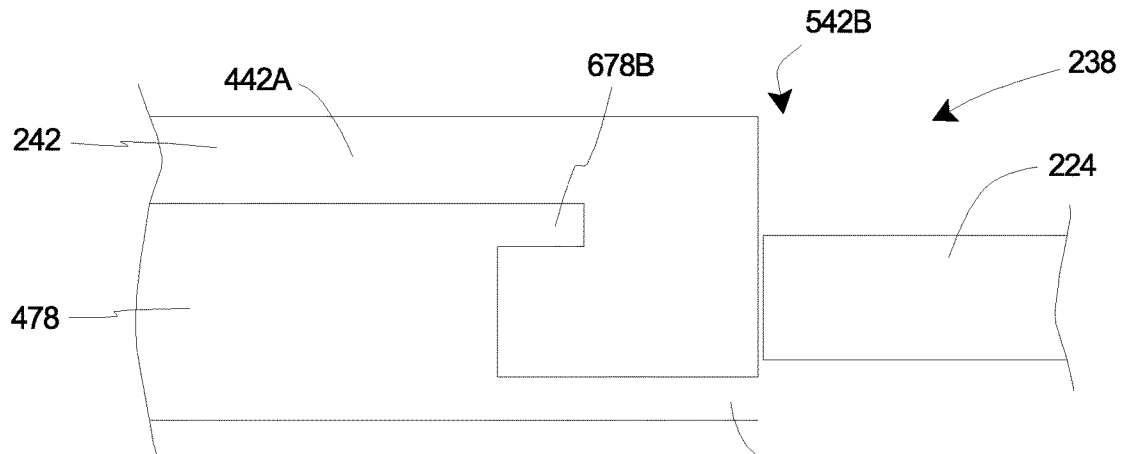
FIG. 6A is a simplified schematic illustration of a portion of the service module illustrated in FIG. 2A, the service module including at least one locking mechanism that is in a retracted position.
Figure 6B:
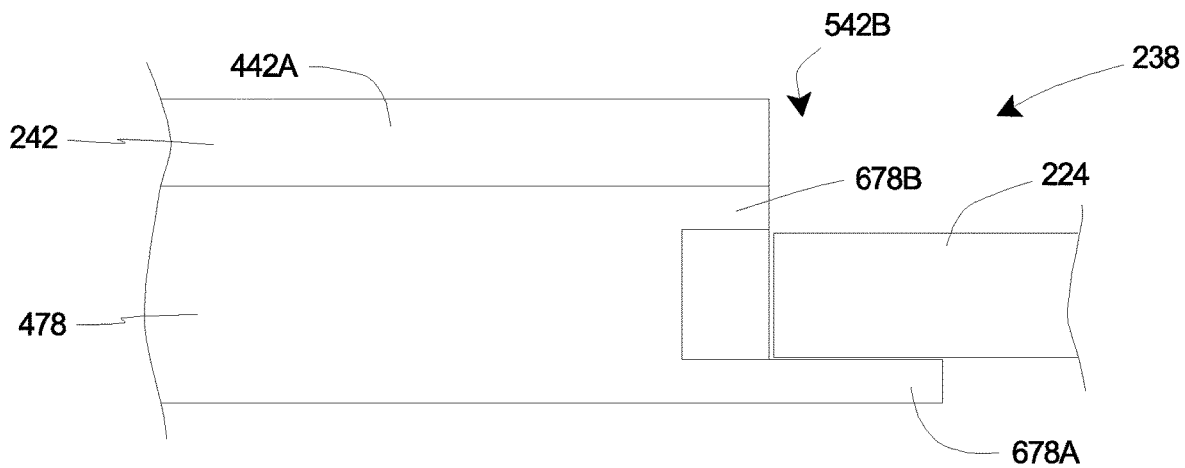
FIG. 6B is a simplified schematic view illustration of the portion of the service module illustrated in FIG. 6A, the at least one locking mechanism being in a partially extended position.
Figure 6C:
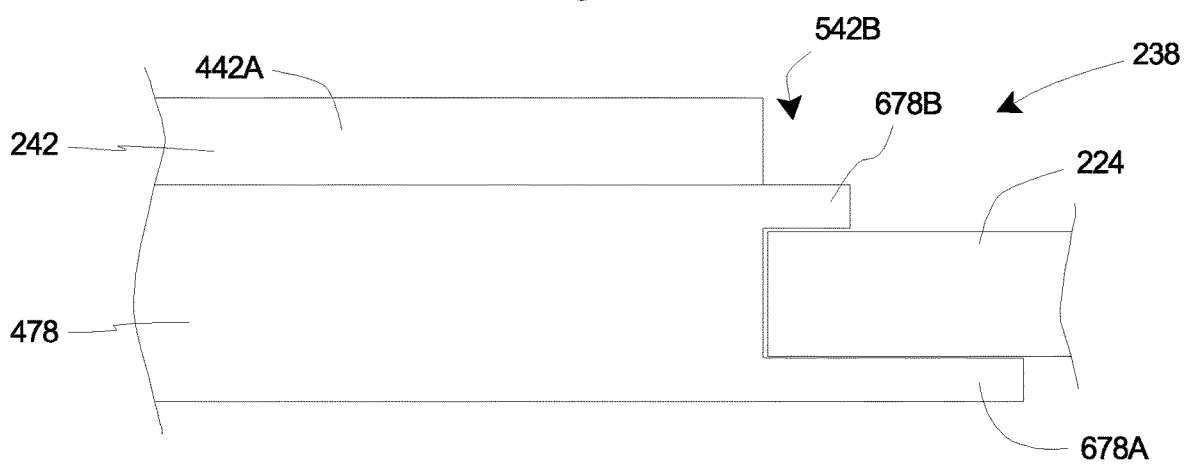
FIG. 6C is a simplified schematic view illustration of the portion of the service module illustrated in FIG. 6A, the at least one locking mechanism being in a fully extended position.

In certain embodiments, the at least one locking mechanism 478 is selectively moved relative to the tray body 442A between a retracted position (illustrated in FIG. 6A), a partially extended position (illustrated in FIG. 6B), and a fully extended position (illustrated in FIG. 6C). More specifically, jumping ahead briefly to FIGS. 6A-6C, FIG. 6A is a simplified schematic illustration of a portion of the service module 238 illustrated in FIG. 2A, the service module 238 including at least one locking mechanism 478 that is in a retracted position; FIG. 6B is a simplified schematic view illustration of the portion of the service module 238 illustrated in FIG. 6A, the at least one locking mechanism 478 being in a partially extended position; and FIG. 6C is a simplified schematic view illustration of the portion of the service module 238 illustrated in FIG. 6A, the at least one locking mechanism 478 being in a fully extended position.

As shown in FIG. 6A, the at least one locking mechanism 478 includes a first extension arm 678A and a spaced apart second extension arm 678B. As described herein, it is appreciated that the spacing between the first extension arm 678A and the second extension arm 678B is approximately equal to a thickness of the portion of the media mover 224 that is directly captured between the first extension arm 678A and the second extension arm 678B. It is appreciated that the at least one locking mechanism 478 can have another suitable design for purposes of securely retaining the media mover 224 within the service tray 242.

When the at least one locking mechanism 478 is in the retracted position, such as shown in FIG. 6A, no part of the locking mechanism 478 extends into the tray opening 542B as defined by the tray body 442A of the service tray 242. Thus, when the locking mechanism 478 is in the retracted position, the media mover 224 can move fully into and through the tray opening 542B so that the media mover 224 can effectively access the media cartridges 20 (illustrated in FIG. 1) in any of the storage slots 18 (illustrated in FIG. 1) and/or in any of the module storage slots 352 (illustrated in FIG. 3).

As noted, FIG. 6B shows the locking mechanism 478 having been moved relative to the tray body 442A, i.e. with the mover assembly 480 (illustrated in FIG. 4) and/or the manual mover 484 (illustrated in FIG. 4), to the partially extended position. More particularly, when the at least one locking mechanism 478 is in the partially extended position, the first extension arm 678A extends into the tray opening 542B as defined by the tray body 442A of the service tray 242, but the second extension arm 678B does not extend into the tray opening 542B. Thus, when the locking mechanism 478 is in the partially extended position, the media mover 224 can be positioned directly adjacent to the first extension arm 678A, e.g., can rest directly on top of the first extension arm 678A. At such time, it can be said that the media mover 224 has been received within the service tray 242, and the media mover 224 is inhibited from moving any further through the tray opening 542B.

Additionally, as noted above, FIG. 6C illustrates the locking mechanism 478 having been moved relative to the tray body 442A, i.e. with the mover assembly 480 (illustrated in FIG. 4) and/or the manual mover 484 (illustrated in FIG. 4), to the fully extended position. More particularly, when the at least one locking mechanism 478 is in the fully extended position, the first extension arm 678A extends to a larger extent into the tray opening 542B as defined by the tray body 442A of the service tray 242, and the second extension arm 678B extends to a lesser extent into the tray opening 542B. Thus, when the locking mechanism 478 is in the fully extended position, a portion of the media mover 224 can be positioned substantially directly adjacent to and between the first extension arm 678A and the second extension arm 678B. At such time, it can be said that the media mover 224 has been securely retained within the service tray 242, and the media mover 224 is inhibited from moving in either direction through the tray opening 542B.

Returning back to FIG. 4, the mover assembly 480 is illustrated which can be utilized for purposes of automatically moving the at least one locking mechanism 478 between the retracted position, the partially extended position and the fully extended position. The mover assembly 480 can have any suitable design for purposes of moving the locking mechanism 478 between such positions. As illustrated in FIG. 4, the mover assembly 480 can include a motor 480A, a motor shaft 480B and a mechanism engager 480C. Alternatively, the mover assembly 480 can have another suitable design.

In the embodiment illustrated in FIG. 4, the motor 480A is configured to rotate the motor shaft 480B. Additionally, as shown, the mechanism engager 480C, e.g., a gear, is mounted on the motor shaft 480B. Thus, the motor 480A rotating the motor shaft 480B also rotates the mechanism engager 480C. Further, as illustrated, the locking mechanism 478 includes an engaged surface 478C, e.g., teeth, that is engaged by the mechanism engager 480C. Accordingly, as the motor 480A rotates the motor shaft 480B and thus the mechanism engager 480C, the mechanism engager 480C engages the engaged surface 478C of the locking mechanism 478 so that the locking mechanism 478 is moved between the retracted position, the partially extended position and the fully extended position.

The sensor assembly 582 is configured to sense, e.g., directly sense, the movement and/or rotation of the motor shaft, and, thus, to sense, e.g., indirectly sense, the movement of the locking mechanism 478 between the retracted position, the partially extended position and the fully extended position. Additionally, the sensor assembly 582 is further configured to sense the position, or proximity, of the media mover 224 relative to the tray body 442A and/or the locking mechanisms 478. The design and functioning of the sensor assembly 582 will be described in greater detail herein below.

As noted above, in some embodiments, the capture assembly 474 can also include the manual activator 483 and the manual mover 484 to enable manual capture of the media mover 224 by the service tray 242 in the event of power failure or if the capture system 474 otherwise fails to automatically secure the media mover 224 within the service tray 242. The manual activator 483 and the manual mover 484 can have any suitable design. In one embodiment, the manual activator 483 can be provided in the form of a plunger that when depressed operatively disengages the motor 480A from the motor shaft 480B, thus enabling the manual rotation of the motor shaft 480C. Additionally, in one embodiment, the manual mover 484 can be provided in the form of a rotating knob that is coupled to the motor shaft 480C, such that rotation of the knob 484 results in a corresponding rotation of the motor shaft 480B. It is further appreciated that, as with the automated process, rotation of the motor shaft 480B thus rotates the mechanism engager 480C, which in turn engages the engaged surface 478C of the locking mechanism 478 and moves the locking mechanism 478 between the retracted position, the partially extended position and the fully extended position. As referred to herein, such components as utilized for purposes of manually capturing the media mover 224 within the service tray 242 can sometimes be referred to as a "manual capture assembly".

FIGS. 5A-5D illustrate additional views of the service tray 242, without the media mover 224 secured thereto, to better and more effectively illustrate certain features and components of the replacement system 236.

Figure 5A:
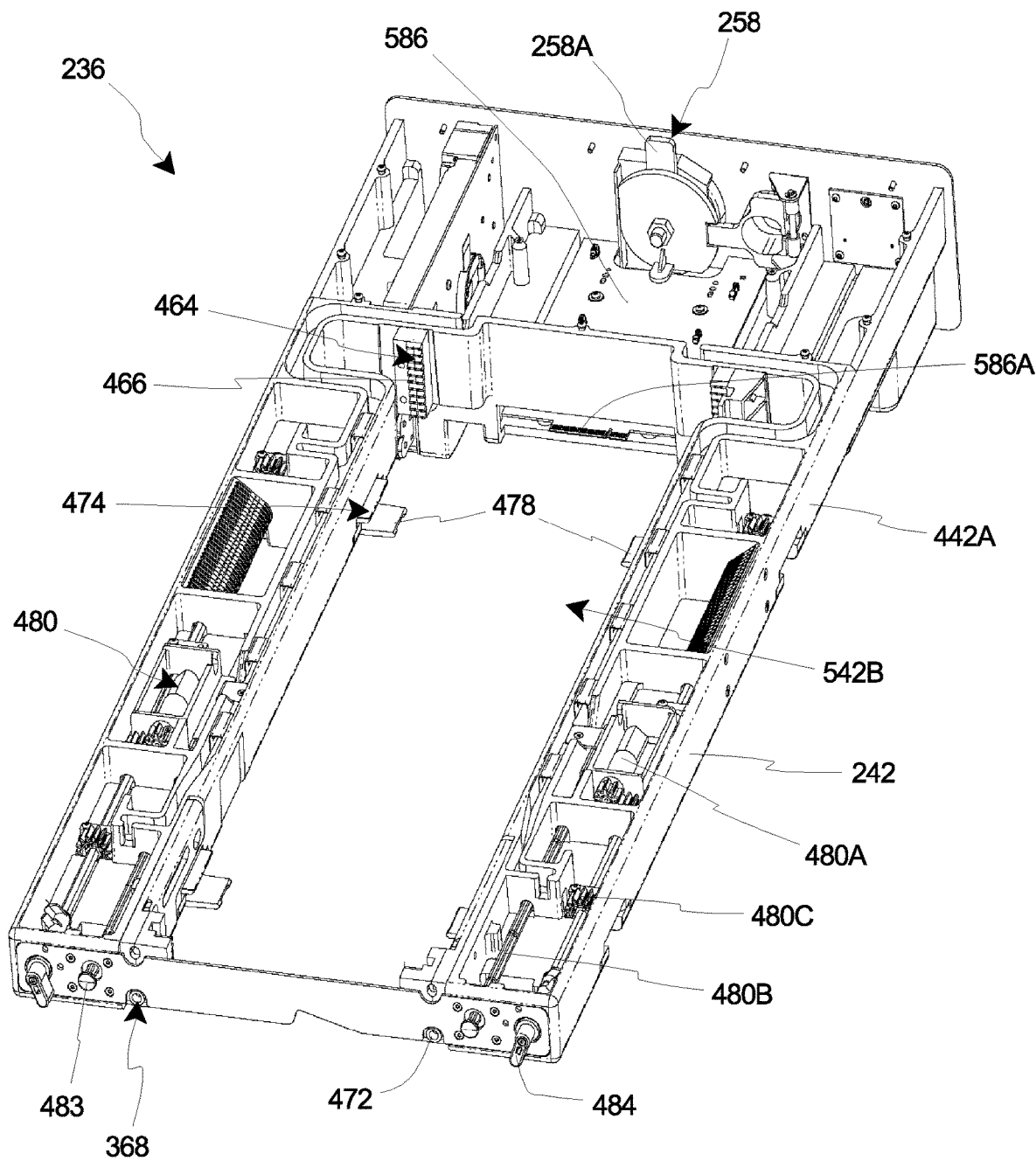
FIG. 5A is a top perspective view illustration of the service tray illustrated in FIG. 4.

FIG. 5A is a top perspective view illustration of the service tray 242 illustrated in FIG. 4 that can be included as part of the replacement system 236. In particular, FIG. 5A again illustrates various features and components of the service tray 242 and/or the replacement system 236 that were illustrated and described above in relation to FIG. 4. For example, FIG. 5A again illustrates that the service tray 242 includes the tray body 442A that defines the tray opening 542B into which the media mover 224 (illustrated in FIG. 2B) is selectively received and retained. Additionally, FIG. 5A further illustrates that the service tray 242 and/or the replacement system 236 can include a portion of the alignment assembly 368 (e.g., the alignment apertures 472)), the tray rack assembly 464 including one or more tray racks 466, the latch assembly 258 (including the retaining latch 258A), and the capture assembly 474. Further, with respect to the capture assembly 474, FIG. 5A more clearly illustrates four locking mechanisms 478 (shown in FIG. 5A in the fully extended position), the mover assembly 480 (including the motor 480A, the motor shaft 480B and the mechanism engager 480C), and the manual activator 483 and the manual mover 484 of the manual capture assembly.

Further, FIG. 5A also illustrates certain additional components that can be included as part of the service module 238 and/or the replacement system 236. For example, FIG. 5A further illustrates a docking card 586 that can be coupled to the service tray 242 to enable electrical conductivity and sensor control. More particularly, the docking card 586 can include a card extension tab 586A that is configured to engage a backplane in the media library 210 which provides electrical connectivity and sensor control. The engagement between the docking card 586, i.e. the card extension tab 586A, and the backplane in the media library 210 can occur during the final precise alignment of the service tray 242, as the service tray 242 with the media mover 224 secured thereto is positioned back into the module housing 248 of the service module 238.

Figure 5B:
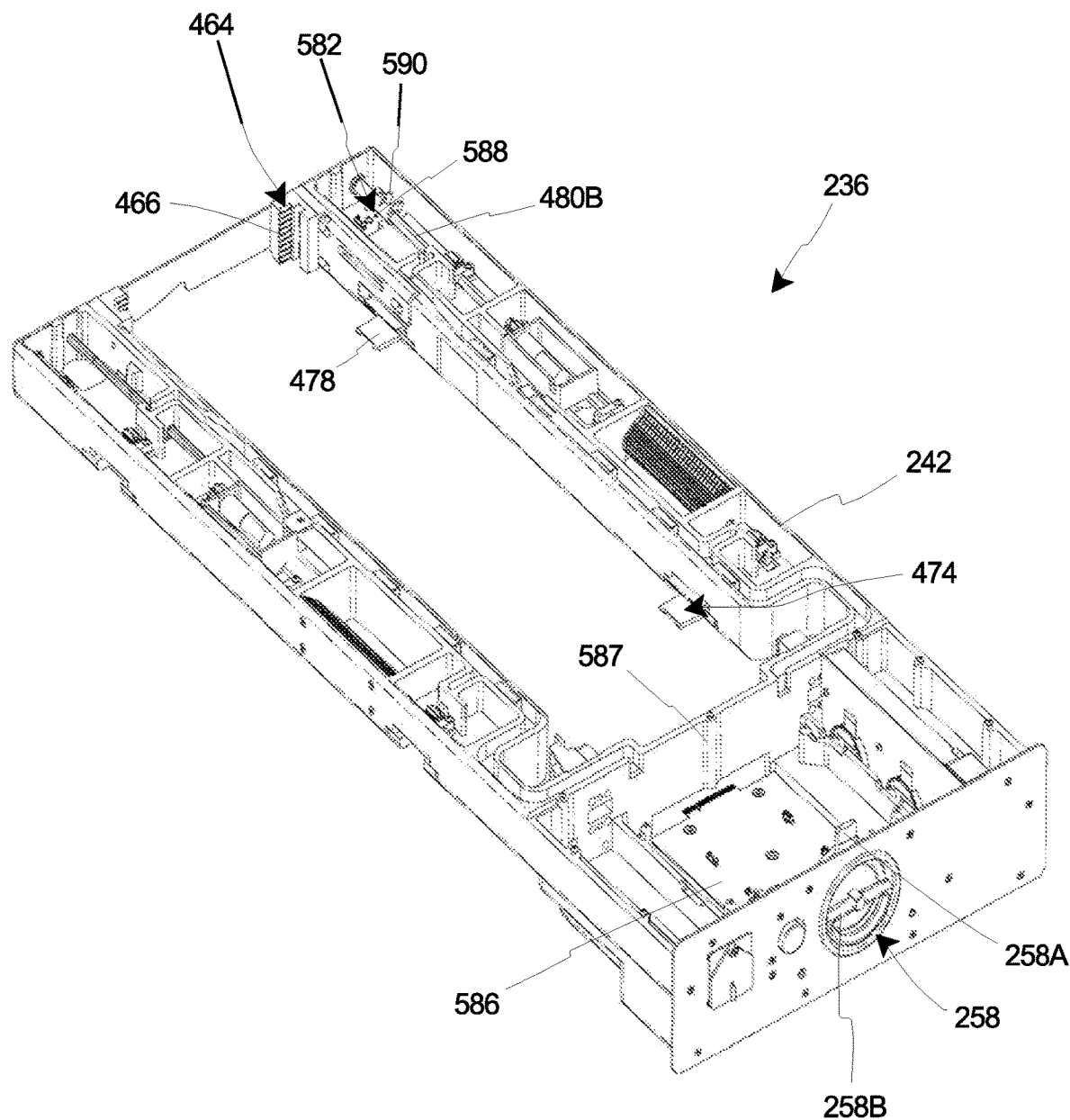
FIG. 5B is another top perspective view illustration of the service tray illustrated in FIG. 4.

FIG. 5B is another top perspective view illustration of the service tray 242 illustrated in FIG. 4. More particularly, FIG. 5B again illustrates various features and components of the service tray 242 and/or the replacement system 236 that were illustrated and described above; and further illustrates certain features and components that were not clearly visible in previous Figures.

For example, FIG. 5B again illustrates the tray rack assembly 464 including one or more tray racks 466, the latch assembly 258 (including the retaining latch 258A and the latch activator 258B), the docking card 586, and various portions of the capture assembly 474. More specifically, FIG. 5B illustrates certain features of the sensor assembly 582 that were not clearly visible in any previous Figures.

As shown in FIG. 5B, the sensor assembly 582 can include one or more first sensors 588, e.g., Hall effect sensors, which are configured to sense the rotation of the motor shaft 480B, and thus the position of the locking mechanisms 478. In some embodiments, a pair of sensed members 590, e.g., paddles, each with a magnet mounted therein or secured thereto, can be mounted on each motor shaft 480B (i.e. on either side of the service tray 242), which are spaced apart from one another laterally along the motor shaft 480B as well as rotationally about the motor shaft 480B. In one such embodiment, the paddles 590 can be spaced apart approximately sixty degrees from one another about the motor shaft 480B. Alternatively, the paddles 590 can be spaced apart greater or less than sixty degrees about the motor shaft 480B. As illustrated, a first, first sensor 588 can be positioned to sense a rotation of a first paddle 590, and a second, first sensor 588 can be positioned to sense a rotation of a second paddle 590. In such embodiment, when the first, first sensor 588 senses a maximum or strongest signal from the first paddle 590 during rotation of the motor shaft 480B, such strong signal is indicative of the locking mechanism 478 having been moved to the partially extended position. Additionally, in such embodiment, when the second, first sensor 588 senses a maximum or strongest signal from the second paddle 590 during rotation of the motor shaft 480B, such strong signal is indicative of the locking mechanism 478 having been moved to the fully extended position. Thus, the one or more first sensors 588 are able to effectively sense the rotational position of the motor shaft 480B and thus the position of the locking mechanisms 478. Alternatively, the sensor assembly 582 and/or the first sensors 588 can have a different design for purposes of sensing the rotational position of the motor shaft 480B and thus the position of the locking mechanisms 478.

Additionally, as shown in FIG. 5B, the service tray 242 can further include an electrostatic discharge (ESD) shielding 587 that is provided to protect the users and operators of the media library 210 by keeping ESD generated by operation of various features of the media library 210 within the media library 210. It is appreciated that the ESD shielding 587 can have any suitable design.

Figure 5C:
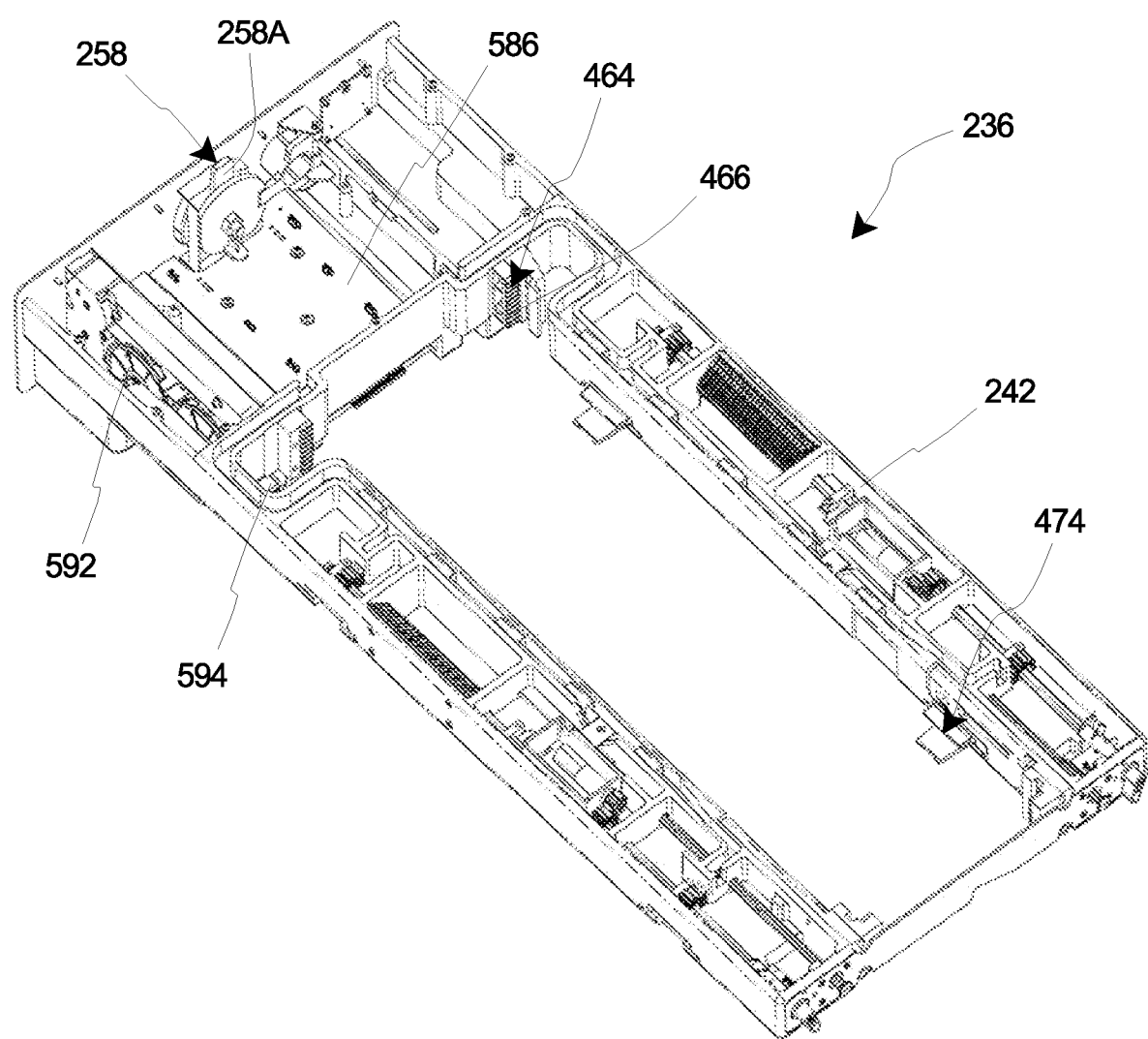
FIG. 5C is still another top perspective view illustration of the service tray illustrated in FIG. 4.

FIG. 5C is still another top perspective view illustration of the service tray 242 illustrated in FIG. 4. In particular, FIG. 5C again illustrates various features and components of the service tray 242 and/or the replacement system 236 that were illustrated and described above; and further illustrates certain features and components that were not clearly visible in previous Figures. For example, FIG. 5C again illustrates the tray rack assembly 464 including one or more tray racks 466, the latch assembly 258 (including the retaining latch 258A), the docking card 586, and various portions of the capture assembly 474.

Additionally, FIG. 5C further illustrates a power and communications source 592, e.g., a power and communications spool, that is coupled to the service tray 242 to provide power and communications to the media mover 224 (illustrated in FIG. 2B). More specifically, in this embodiment, the power and communications source 592 is electrically coupled to the docking card 586, and an engagement tab 594, which is positioned to selectively engage the media mover 224. It is appreciated that the power and communications source 592 can have any suitable design for purposes of providing the desired power and communications capabilities to the media mover 224.

Figure 5D:
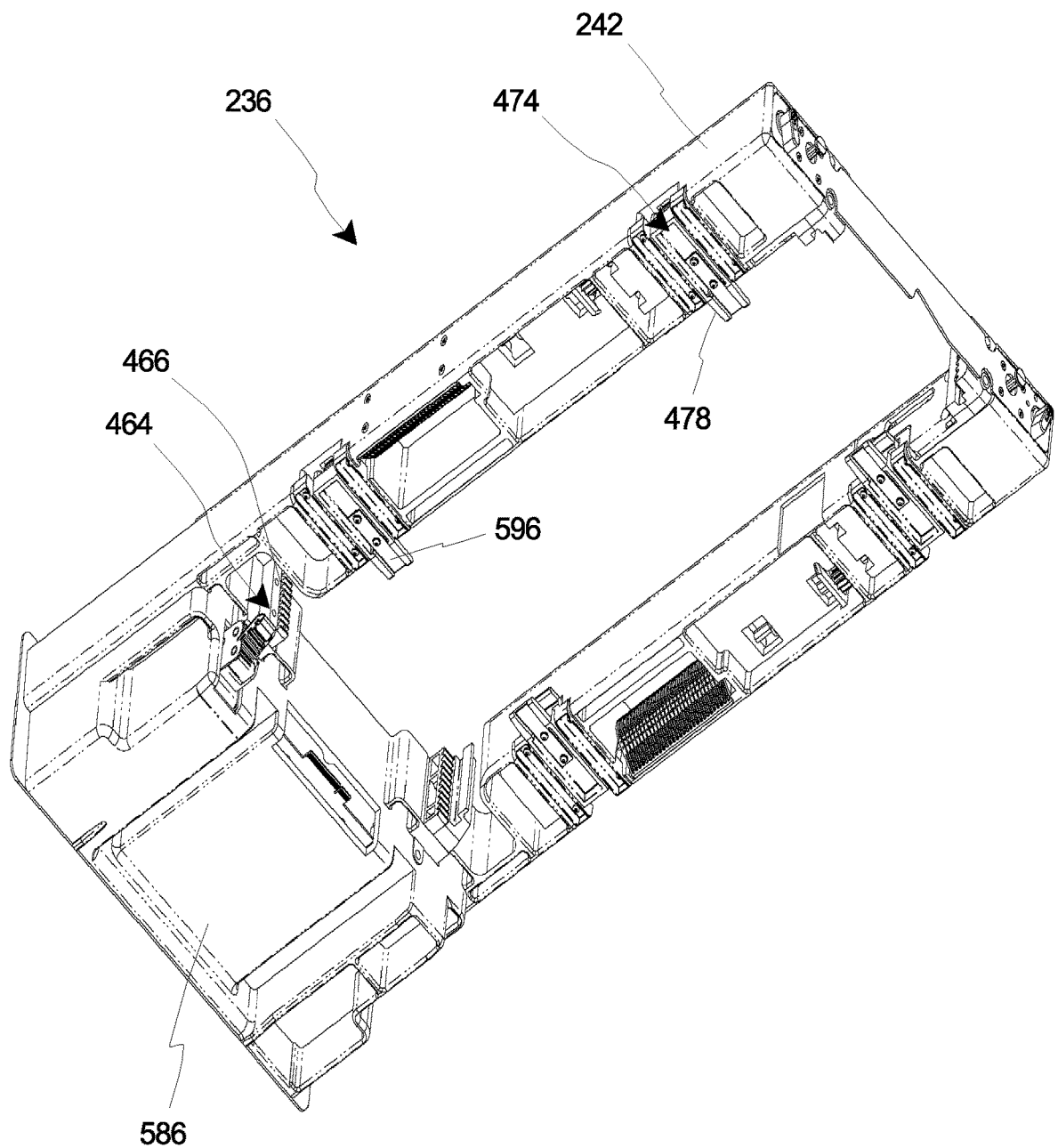
FIG. 5D is a bottom perspective view illustration of the service tray illustrated in FIG. 4.

FIG. 5D is a bottom perspective view illustration of the service tray 242 illustrated in FIG. 4. In particular, FIG. 5D again illustrates various features and components of the service tray 242 and/or the replacement system 236 that were illustrated and described above; and further illustrates certain features and components that were not clearly visible in previous Figures.

For example, FIG. 5D again illustrates the tray rack assembly 464 including one or more tray racks 466, the docking card 586, and various portions of the capture assembly 474. However, FIG. 5D further illustrates certain features of the sensor assembly 582 that were not clearly visible in any previous Figures.

As shown in FIG. 5D, the sensor assembly 582 can further include one or more second sensors 596, with one second sensor 596 being coupled to each of the locking mechanisms 478. In certain embodiments, the second sensors 596 are proximity sensors that are configured to sense the proximity of certain components, i.e. the media mover 224 (illustrated in FIG. 2B) in this instance, to the sensor 596 and thus the proximity to the locking mechanisms 478. More specifically, the second sensors 596 are configured to sense when the media mover 224 is sufficiently close to the corresponding locking mechanism 478 such that the media mover 224 is in position to be effectively captured by the locking mechanism 478. The second sensors 596 can have any suitable design for purposes of accurately sensing the proximity of the media mover 224.

As described in detail herein, the one or more first sensors 588 (illustrated in FIG. 5B) and the one or more second sensors 596 operate in conjunction with one another to recognize when the media mover 224 is in position to be captured, and then to ensure that the locking mechanisms 478 are moved appropriately to execute the desired capture of the media mover 224. It is appreciated that the reference to the one or more first sensors 588 and the one or more second sensors 596 is merely for convenience and ease of discussion, and either sensors 588, 596 can be referred to as "first sensors" or "second sensors"

As provided herein, the method or procedure for positioning the service tray 242, with the media mover 224 securely retained therein, into the module housing 248 (illustrated in FIG. 2A) of the service module 238 includes the following general steps:

1) The service tray 242 is initially slid into an oversized slot, i.e. the insert cavity 254 (illustrated in FIG. 2B), as defined by the module housing 248 permitting easy insertion into the media library 210;

2) Approximately one inch before being fully seated within the module housing 248, the service tray 242 engages four alignment pins 370 on the module housing 248 which precisely locate the service tray 242 within the module housing 248;

3) During this final precise alignment, a docking card 586 engages a backplane in the media library 210 which provides electrical connectivity and sensor control;

4) Due to the length of the service tray 242, spring-loaded features, e.g., resilient member(s) 476, are employed to guarantee accurate placement of the tray rack assembly 464 to ensure smooth movement of the media mover 224 between the rack assembly 22 (illustrated in FIG. 1) of the standard library housing 246 (illustrated in FIG. 2A), the tray rack assembly 464, and the module rack assembly 360 of the module housing 248.

Additionally, as provided herein, it is appreciated that the removal and/or replacement of the media mover 224, i.e. via the replacement system 236, can be accomplished via an automated removal process or via a manual removal process. The basic details of such alternative processes, as described in detail above, will be summarized below.

During an automated removal process, the following general steps will occur:

1) After requesting removal of the media mover 224, the media mover 224 will position itself adjacent to locking mechanisms 478 (or "catches") in the service tray 242;

2) These locking mechanisms 478 have sensors 596, i.e. proximity sensors, which confirm that the media mover 224 is correctly located for capture;

3) Motors 480A then drive the locking mechanisms 478 into the proper capture position, i.e. the fully extended position, with the capture position being monitored by magnetic sensors 588, e.g., Hall effect sensors;

4) Successful capture of the media mover 224 by the locking mechanisms 478 is then indicated via the network, GUI and LEDs;

5) The service tray 242 and media mover 224 can now be removed as an integral unit and replaced;

6) New and/or maintained or repaired service tray 242 and media mover 224 can now be reinserted back into the module housing 248 in a manner as described above; and 7) Once replaced, the media mover 224 will automatically reinitialize to be prepared for proper functionality within the media library 210.

Alternatively, during a manual removal process, the following general steps will occur:

1) After requesting removal of the media mover 224, failure of the media mover 224 to automatically move to the service tray 242 will result in flashing yellow lights indicating that manual removal is required;

2) Manual removal requires pushing the media mover 224 from the front of the media library into the service tray 242—access to the media mover 224 and the service tray 242 can be gained via partial or full removal of the module magazines 250;

3) The manual operator can then depress the manual activator 483, e.g., the plunger, and rotate the manual mover 484, e.g., manual rotator, to move the locking mechanisms 478 into the proper capture position;

4) The service tray 242 and media mover 224 can now be removed and replaced;

5) New and/or maintained or repaired service tray 242 and media mover 224 can now be reinserted back into the module housing 248 in a manner as described above; and 6) Once replaced, the media mover 224 will automatically reinitialize to be prepared for proper functionality within the media library 210.

Additionally, as provided herein, the unique mover replacement system 236 and method for rapid replacement of the media mover 224 from within the media library 210 provides various features and advantages. More particularly, the replacement system 236 and method as described herein at least provides the following features:

1) The service tray 242 can be used for shipping;

2) The service tray 242 contains power and communications cables 592;

3) The service tray 242 is ESD shielded;

4) The service tray 242 can be returned and tested for repair, servicing and failure analysis;

5) The service tray protects the media mover 224 from contact or damage during handling/replacement;

6) The service tray 242 and/or service module 238 can be located anywhere in a stacked media library system 210;

7) The pass-through design allows for ergonomic positioning;

8) The service tray 242 senses correct positioning of the media mover 224 in the service tray 242 prior to removal;

9) The service tray 242 automatically captures the media mover 224;

10) The service tray 242 further allows for manual replacement of the media mover 224 in the event of power failure or if the media mover 224 otherwise does not properly move to the service tray 242;

11) The service tray 242 allows for automatic replacement of the media mover 224 in less than two minutes;

12) The service tray 242 has precision alignment features—e.g., alignment apertures 472—to assure proper alignment of the service tray 242 within the module housing 248;

13) The module housing 248 of the service module 238 of the media library 210 has matching alignment features, e.g., alignment pins 370 to precisely locate the service tray 242 within the module housing 248;

14) The media library 210 can use "cloud analytics" to determine whether the media mover 224 needs to be replaced;

15) The module housing 248 of the service module 238 of the media library 210 has oversized guides 256 for easy insertion of the service tray 242—e.g., the module housing 248 has oversized guides 256 with a large lead-in ramp minimizing the amount of room required for replacement behind the media library 210; and 16) The media library 210 optimizes data storage by providing cartridge storage, e.g., via the module storage slots 352 in the module magazines 250, nested underneath the service tray 242.

It is understood that although a number of different embodiments of the mover replacement system 236 have been illustrated and described herein, one or more features of any one embodiment can be combined with one or more features of one or more of the other embodiments, provided that such combination satisfies the intent of the present invention.

While a number of exemplary aspects and embodiments of the mover replacement system 236 have been discussed above, those of skill in the art will recognize certain modifications, permutations, additions and sub-combinations thereof. It is therefore intended that the following appended claims and claims hereafter introduced are interpreted to include all such modifications, permutations, additions and sub- combinations as are within their true spirit and scope.

What is claimed is:

1. A mover replacement system for removing a media mover from a media library, the media library including a library housing, a plurality of storage slots that are positioned within the library housing and that are each configured to receive and selectively retain a media cartridge, and a media drive that is positioned within the library housing, the media mover being movable between an operating position, in which the media mover is configured to selectively move one of the media cartridges between one of the plurality of storage slots and the media drive, and a removable position, the mover replacement system comprising:
a service tray that is removably positionable within the library housing, the service tray including a tray body; and
a capture assembly that is configured to enable the service tray to securely receive and releasably retain the media mover when the media mover is in the removable position, the capture assembly including at least one locking mechanism that is movable relative to the tray body between a retracted position when the at least one locking mechanism is positioned not to engage the media mover, and a fully extended position when the at least one locking mechanism is positioned to retain the media mover relative to the tray body when the media mover is in the removable position so that the service tray and the media mover are movable as an integral unit out of and into the library housing; and
wherein the media mover is uncoupled from the service tray when the media mover is moved to the operating position.

2. The mover replacement system of claim 1 wherein the capture assembly further includes a first sensor that is positioned adjacent to the at least one locking mechanism, the first sensor being configured to sense a position of the media mover relative to the at least one locking mechanism.

3. The mover replacement system of claim 1 wherein the tray body defines a tray opening, and wherein the media mover is releasably retained within the tray opening.

4. The mover replacement system of claim 3 wherein the at least one locking mechanism includes a first extension arm and a second extension arm; wherein when the at least one locking mechanism is in the retracted position, neither the first extension arm nor the second extension arm extend into the tray opening; and
wherein when the at least one locking mechanism is in the fully extended position, both the first extension arm and the second extension arm extend into the tray opening.

5. The mover replacement system of claim 4 wherein the at least one locking mechanism is further movable relative to the tray body to a partially extended position wherein the first extension arm extends into the tray opening but the second extension arm does not extend into the tray opening.

6. The mover replacement system of claim 1 further comprising a plurality of guide rails that are coupled to the library housing, the guide rails being configured to guide the movement of the service tray into and out of the library housing.

7. The mover replacement system of claim 1 wherein the library housing includes an insert cavity that is configured to receive the service tray.

8. The mover replacement system of claim 1 further comprising an alignment assembly that is configured to ensure that the service tray is properly aligned within the library housing, the alignment assembly including a plurality of first alignment members that are coupled to the library housing, and a plurality of second alignment members that are coupled to the service tray; wherein each of the plurality of second alignment members is configured to engage one of the plurality of first alignment members as the service tray is positioned within the library housing.

9. A media library including a media mover and the mover replacement system of claim 1.

10. A mover replacement system system for removing a media mover from a media library, the media library including a library housing, the media mover being movable between an operating position and a removable position, the mover replacement system comprising:
a service tray that is removably positionable within the library housing, the service tray including a tray body; and
a capture assembly that is configured to enable the service tray to securely receive and releasably retain the media mover when the media mover is in the removable position, the capture assembly including at least one locking mechanism that is movable relative to the tray body between a retracted position when the at least one locking mechanism is positioned not to engage the media mover, and a fully extended position when the at least one locking mechanism is positioned to retain the media mover relative to the tray body when the media mover is in the removable position so that the service tray and the media mover are movable as an integral unit out of and into the library housing; and
wherein the capture assembly further includes a mover assembly that selectively moves the at least one locking mechanism between the retracted position and the fully extended position, the mover assembly including a motor shaft, a motor that selectively rotates the motor shaft, and a mechanism engager that engages an engaged surface of the at least one locking mechanism; wherein rotation of the motor shaft rotates the mechanism engager to move the at least one locking mechanism between the retracted position and the fully extended position.

11. The mover replacement system of claim 10 wherein the capture assembly further includes a sensor assembly including a first sensor that senses the rotation of the motor shaft as the at least one locking mechanism is being moved between the retracted position and the fully extended position.

12. A mover replacement system for removing a media mover from a media library, the media library including a library housing, a plurality of storage slots that are positioned within the library housing and that are each configured to receive and selectively retain a media cartridge, and a media drive that is positioned within the library housing, the media mover being movable between an operating position, in which the media mover is configured to selectively move one of the media cartridges between one of the plurality of storage slots and the media drive, and a removable position, the mover replacement system comprising:
a service tray that is removably positionable within the library housing, the service tray being configured to releasably retain the media mover when the media mover is in the removable position so that the service tray and the media mover are movable as an integral unit out of and into the library housing, and the media mover being uncoupled from the service tray when the media mover is moved to the operating position; and
an alignment assembly that is configured to ensure that the service tray is properly aligned within the library housing, the alignment assembly including a plurality of first alignment members that are coupled to the library housing, and a plurality of second alignment members that are coupled to the service tray; wherein each of the plurality of second alignment members is configured to engage one of the plurality of first alignment members as the service tray is positioned within the library housing; and wherein each of the plurality of second alignment members is configured not to engage one of the plurality of first alignment members when the service tray has been removed from within the library housing.

13. The mover replacement system of claim 12 wherein the first alignment members include alignment pins; and wherein the second alignment members include alignment apertures.

14. The mover replacement system of claim 12 wherein the first alignment members include alignment apertures; and wherein the second alignment members include alignment pins.

15. The mover replacement system of claim 12 further comprising a plurality of guide rails that are coupled to the library housing, the guide rails being configured to guide the movement of the service tray into and out of the library housing.

16. The mover replacement system of claim 12 wherein the library housing includes an insert cavity that is configured to receive the service tray.

17. The mover replacement system of claim 12 further comprising a capture assembly that is configured to enable the service tray to securely receive and releasably retain the media mover when the media mover is in the removable position, the capture assembly including at least one locking mechanism that is movable relative to the tray body between a retracted position when the at least one locking mechanism is positioned not to engage the media mover, and a fully extended position when the at least one locking mechanism is positioned to retain the media mover relative to the tray body when the media mover is in the removable position so that the service tray and the media mover are movable as an integral unit out of and into the library housing.

18. The mover replacement system of claim 17 wherein the tray body defines a tray opening, and wherein the media mover is releasably retained within the tray opening.

19. The mover replacement system of claim 18 wherein the at least one locking mechanism includes a first extension arm and a second extension arm; wherein when the at least one locking mechanism is in the retracted position, neither the first extension arm nor the second extension arm extend into the tray opening; and wherein when the at least one locking mechanism is in the fully extended position, both the first extension arm and the second extension arm extend into the tray opening.

20. A media library including a media mover and the mover replacement system of claim 12.

* * * * *